(12) United States Patent
Nayak et al.

(10) Patent No.: US 10,951,468 B1
(45) Date of Patent: *Mar. 16, 2021

(54) APPARATUS, SYSTEM, AND METHOD FOR DYNAMICALLY SCALING MEMORY FOR VIRTUAL ROUTERS

(71) Applicant: Juniper Networks, Inc., Sunnyvale, CA (US)

(72) Inventors: Manoj Nayak, Bangalore (IN); Rafik Putter, Bangalore (IN); Tabrez Ahmed Khan, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,461

(22) Filed: Apr. 7, 2020

Related U.S. Application Data

(63) Continuation of application No. 15/925,703, filed on Mar. 19, 2018, now Pat. No. 10,659,293.

(51) Int. Cl.
*G06F 9/50* (2006.01)
*H04L 12/24* (2006.01)
*H04L 12/713* (2013.01)

(52) U.S. Cl.
CPC ........ *H04L 41/0803* (2013.01); *G06F 9/5016* (2013.01); *G06F 9/5077* (2013.01); *H04L 45/586* (2013.01)

(58) Field of Classification Search
CPC ............... H04L 41/0806; H04L 45/586; H04L 41/0803; G06F 9/5016; G06F 9/5077
See application file for complete search history.

*Primary Examiner* — Gbemileke J Onamuti
(74) *Attorney, Agent, or Firm* — FisherBroyles, LLP

(57) ABSTRACT

A disclosed method may include (1) executing a virtual router that services traffic within a network in connection with a specific network consumer and (2) dynamically scaling memory of the virtual router to accommodate a networking need of the specific network consumer by (A) installing, in at least one component of a physical network device that hosts the virtual router, a set of networking objects that facilitate servicing the traffic in connection with the specific network consumer, (B) determining an amount of memory that is consumed by the set of networking objects at the component of a physical network device, and (C) modifying a configuration file of the virtual router such that the memory of the virtual router is scaled to store the set of networking objects via the component. Various other systems and methods are also disclosed.

20 Claims, 7 Drawing Sheets

APPARATUS, SYSTEM, AND METHOD FOR DYNAMICALLY SCALING MEMORY FOR VIRTUAL ROUTERS

CROSS REFERENCE TO RELATED APPLICATION

This application is a continuation of U.S. application Ser. No. 15/925,703 filed 19 Mar. 2018, the disclosure of which is incorporated, in its entirety, by this reference.

BACKGROUND

Network devices (such as routers and switches) are often used to forward traffic within a network and/or across networks. These network devices may be available to users in many forms. For example, routers may be offered as physical devices and/or virtual solutions. In the physical form, a router may include a memory device whose memory capacity remains fixed and/or invariable due to the physical nature of the device itself. In the virtual form, a router may be provisioned a memory allocation of an underlying physical host device. While the size of the virtual router's memory allocation is not necessarily limited by physics, the logistics of providing such a traditional virtual router to users may influence and/or force offerings or sales at fixed and/or rigid memory increments.

As an example, a line of physical and virtual routers may include and/or provide a minimum of 3.5 gigabytes of fixed memory. In one example, a user who purchases a physical or virtual router from this line may be forced to purchase 3.5 gigabytes of memory even in the event that the user needs only a small portion of that memory. Similarly, a user who needs slightly more than 3.5 gigabytes of memory may be forced to purchase two physical or virtual routers to meet its needs. From an efficiency- and/or cost-effectiveness standpoint, neither of these options is ideal or optimal for the user.

The instant disclosure, therefore, identifies and addresses a need for additional and improved apparatuses, systems, and methods for dynamically scaling memory for virtual routers.

SUMMARY

As will be described in greater detail below, the instant disclosure generally relates to systems and methods for dynamically scaling memory for virtual routers. In one example, a method for accomplishing such a task may include (1) executing a virtual router that services traffic within a network in connection with a specific network consumer and (2) dynamically scaling memory of the virtual router to accommodate a networking need of the specific network consumer by (A) installing, in at least one component of a physical network device that hosts the virtual router, a set of networking objects that facilitate servicing the traffic in connection with the specific network consumer, (B) determining an amount of memory that is consumed by the set of networking objects at the component of a physical network device, and (C) modifying a configuration file of the virtual router such that the memory of the virtual router is scaled to store the set of networking objects via the component.

Similarly, a system that implements the above-described method may include various modules that are stored in memory and executed by at least one physical processing device. For example, the system may include (1) a virtualization module that executes a virtual router that services traffic within a network in connection with a specific network consumer, (2) a routing daemon that installs, in at least one component of a physical network device that hosts the virtual router, a set of networking objects that facilitate servicing the traffic in connection with the specific network consumer, and (3) a scaling module that dynamically scales memory of the virtual router to accommodate a networking need of the specific network consumer by (A) determining an amount of memory that is consumed by the set of networking objects at the component of the physical network device and (B) modifying a configuration file of the virtual router such that the memory of the virtual router is scaled to store the set of networking objects via the component.

In addition, an apparatus that implements the above-described method may include at least physical storage device that stores a set of networking objects that facilitate servicing the traffic in connection with the specific network consumer. In this example, the apparatus may also include a physical processor that is communicatively coupled to the storage device. The physical processor may (1) execute a virtual router that services traffic within a network in connection with a specific network consumer and (2) dynamically scales memory of the virtual router to accommodate a networking need of the specific network consumer by (A) installing the set of networking objects in at least one component of a physical network device that hosts the virtual router, (B) determining an amount of memory that is consumed by the set of networking objects at the component of the physical network device, and (C) modifying a configuration file of the virtual router such that the memory of the virtual router is scaled to store the set of networking objects via the component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
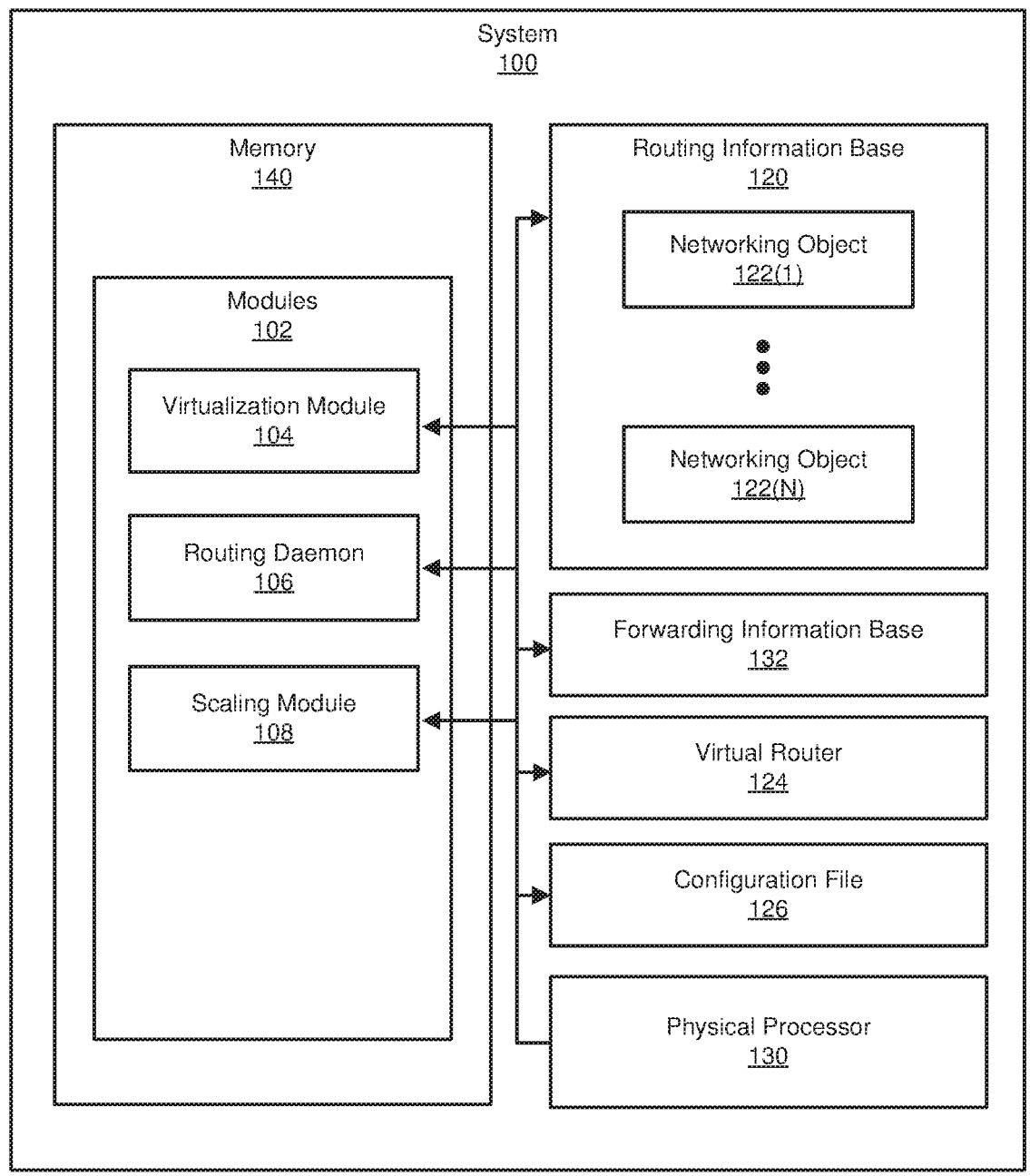
FIG. 1 is a block diagram of an exemplary system for dynamically scaling memory for virtual routers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for dynamically scaling memory for virtual routers. As will be explained in greater detail below, embodiments of the instant disclosure may enable network equipment venders or providers to customize, execute, and/or deliver virtual routers that cater specially to the needs of the individual users. In other words, embodiments of the instant disclosure may enable network equipment venders or providers to efficiently build and/or configure virtual routers tailored to the individual users.

As an example, a network equipment vender may customize a virtual router for a customer whose network needs approximately 500 megabytes of Virtual Control Plane (VCP) memory and approximately 2 gigabytes of Virtual Forwarding Plane (VFP) memory. To cater specifically to this customer's needs, the network equipment vender may provide this customized virtual router to the customer so that the customer is able to avoid purchasing a much larger physical or virtual router (e.g., a router with 1 gigabyte of VCP memory and 4 gigabytes of VFP memory) whose full capacity and/or functionality will remain untapped—at least in the short-term.

By dynamically scaling memory for virtual routers in this way, embodiments of the instant disclosure may enable network equipment venders to achieve a more efficient utilization of the underlying physical host device. Moreover, embodiments of the instant disclosure may enable network equipment venders to provide virtualized routing and/or forwarding solutions to more customers without necessarily increasing the number of underlying physical host devices. Embodiments of the instant disclosure may also enable network equipment venders to increase profits and/or pass on savings to its customers. Additionally or alternatively, embodiments of the instant disclosure may enable network equipment customers to dynamically increase and/or decrease the amount of memory that is allocated to virtual routers with high granularity and/or precision, thereby improving the utilization efficiency of their virtual routers.

The following will provide, with reference to FIGS. 1, 2, and 4-6, detailed descriptions of exemplary apparatuses and systems for dynamically scaling memory for virtual routers. Detailed descriptions of corresponding computer-implemented methods will be provided in connection with FIG. 3. In addition, detailed descriptions of an exemplary computing system for carrying out these methods will be provided in connection with FIG. 7.

FIG. 1 is a block diagram of an exemplary system 100 for dynamically scaling memory for virtual routers. As illustrated in this figure, exemplary system 100 may include one or more modules 102 for performing one or more tasks. As will be explained in greater detail below, modules 102 may include a virtualization module 104, a routing daemon 106, and a scaling module 108. Although illustrated as separate elements, one or more of modules 102 in FIG. 1 may represent portions of a single module or application (such as a virtual router or machine). All or a portion of system 100 may constitute and/or represent an apparatus that facilitates dynamically scaling memory for virtual routers.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices such as the devices illustrated in FIG. 2 (e.g., network devices 202(1)-(N) and/or computing device 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, distributed memory devices and/or solutions, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to dynamically scale memory for virtual routers. Examples of physical processor 130 include, without limitation microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more Routing Information Bases (RIBS), such as RIB 120. In some examples, RIB 120 may include and/or represent a routing table and/or database that stores networking objects 122(1)-(N) that facilitate routing traffic within a network. In one example, RIB 120 may be stored, maintained, and/or located within user space on a physical device. Additionally or alternatively, RIB 120 may be incorporated into, allocated to, and/or represent part of a virtual router. Accordingly, RIB 120 may correspond to and/or represent some or all of a Virtual Control Plane (VCP) for a virtual router. Thus, RIB 120 may be hosted by a physical device and/or allocated to a virtual router for use by a network consumer.

Networking objects 122(1)-(N) each generally correspond to data that represents a portion of a network, network device, and/or network interface. In one example, networking objects 122(1)-(N) may include data representations of and/or references to physical devices or interfaces (such an "ifd"), logical devices or interfaces (such as an "ifl"), next hops, and/or routes (such as IPv4 or IPv6 routes). Additional examples of networking objects 122(1)-(N) include, without limitation, functions, variables, data structures, primitive types, records, route tables, buffers, host cache entries, memory addresses, network addresses, variations or combinations of one or more of the same, or any other suitable networking objects.

As illustrated in FIG. 1, exemplary system 100 may also include one or more Forwarding Information Bases (FIBs), such as FIB 132. In some examples, FIB 132 may include and/or represent a forwarding table and/or database that stores networking objects that facilitate forwarding traffic within a network. In one example, FIB 132 may be stored, maintained, and/or located within kernel space on a physical device. Additionally or alternatively, FIB 132 may be incorporated into, allocated to, and/or represent part of a virtual router. Accordingly, FIB 132 may be hosted by a physical device and/or allocated to a virtual router for use by a network consumer.

The term "user space," as used herein, generally refers to any memory and/or address space that has been designated for and/or allocated to application software and/or components on a computing device. The term "kernel space," as used herein, generally refers to any memory and/or address space that has been designated for and/or allocated to an operating system kernel and/or operating system components on a computing device. In some examples, user space and kernel space may include and/or represent mutually exclusive virtual memory allocations and/or execution contexts that are separate and/or segregated from one another.

As illustrated in FIG. 1, exemplary system 100 may further include one or more virtual routers, such as virtual router 124. In some examples, virtual router 124 may include and/or represent a virtual machine that is hosted by an underlying physical device. Virtual router 124 may route, service, and/or forward traffic on behalf of and/or in connection with a network consumer (such as an Internet Service Provider (ISP), a telecommunications provider, a media service, etc.). Accordingly, virtual router 124 may provide and/or offer many, if not all, of the routing and/or forwarding services provided and/or offered by a traditional physical router.

In one example, virtual router 124 may run on and/or be executed or hosted by a physical router. In this example, the physical router that executes and/or hosts virtual router 124 may be maintained by and/or located at a physical site of a network equipment vendor (such as JUNIPER NETWORKS, CISCO SYSTEMS, HUAWEI TECHNOLOGIES, ALCATEL-LUCENT, etc.) and/or third party. Accordingly, virtual router 124 may be provisioned by a network equipment vendor to service traffic for a network consumer.

As illustrated in FIG. 1, exemplary system 100 may additionally include one or more configuration files, such as configuration file 126. In some examples, configuration file 126 may control and/or define the configuration of virtual router 124 and/or one or more memory allocations for RIB 120 and/or FIB 132. In one example, configuration file 126 may be modified to dynamically scale the amount of memory that is allocated to virtual router 124. For example, configuration file 126 may be modified to increase and/or decrease the amount of memory allocated to the VCP and/or VFP of virtual router 124.

Figure 2:
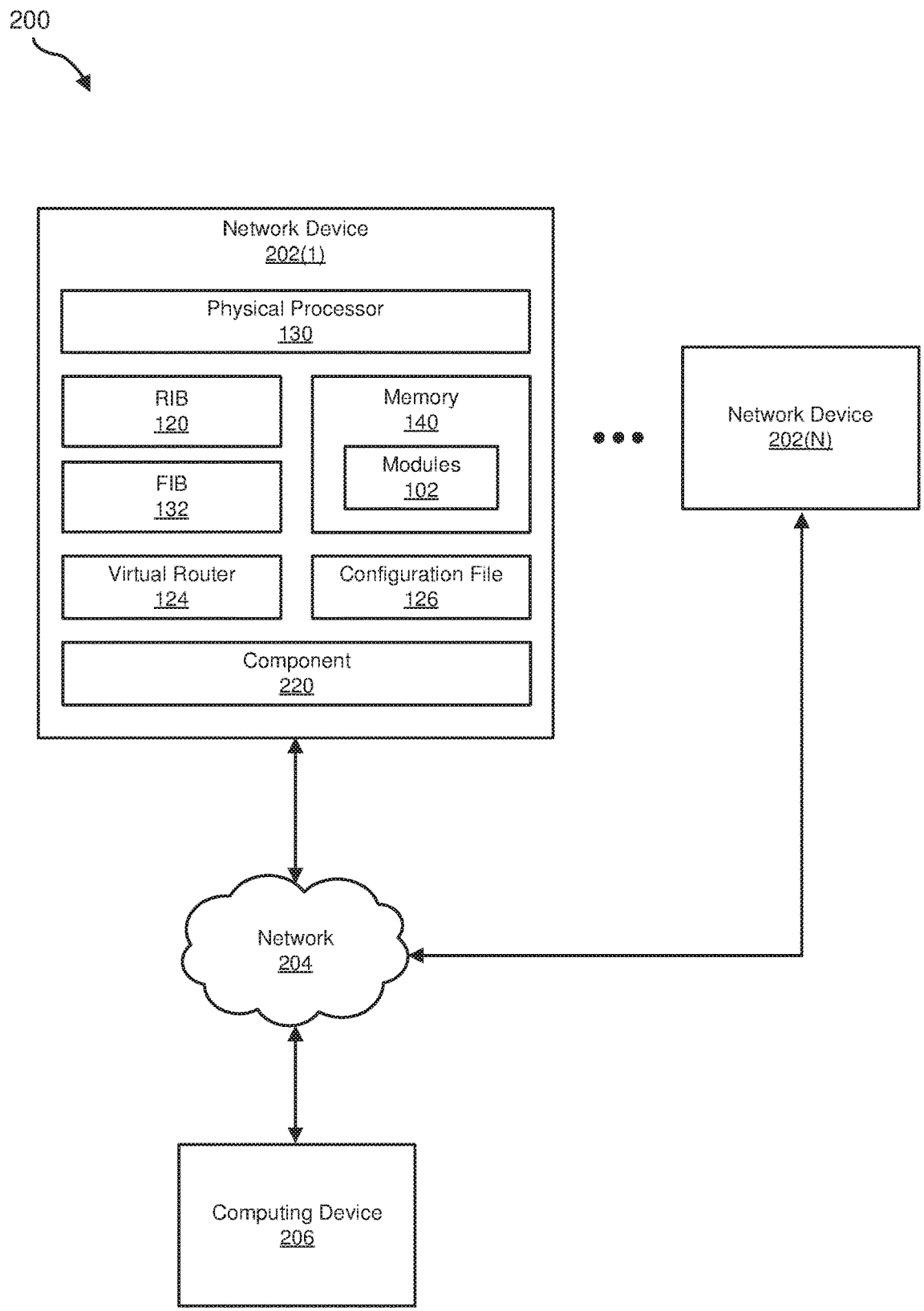
FIG. 2 is a block diagram of an exemplary system for dynamically scaling memory for virtual routers.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include one or more network devices 202(1)-(N) and a computing device 206 in communication with one another via a network 204. In one example, all or a portion of the functionality of modules 102 may be performed by network devices 202(1)-(N), computing device 206, and/or any other suitable computing system (whether or not explicitly illustrated in FIG. 2). As will be described in greater detail below, one or more of modules 102 from FIG. 1 may, when executed by at least one physical processor of network device 202(1) or 202(N), enable network device 202(1) or 202(N) to dynamically scale memory for virtual router 124.

For example, and as will be described in greater detail below, one or more of modules 102 may cause network device 202(1) to (1) execute virtual router 124 that services traffic within a network in connection with a specific network consumer (such as an ISP) and (2) dynamically scale memory of virtual router 124 to accommodate a networking need of the specific network consumer by (A) installing, in at least one component 220 of network device 202(1) that hosts virtual router 124 networking objects 122(1)-(N) that facilitate servicing the traffic in connection with the specific network consumer, (B) determining an amount of memory that is consumed by networking objects 122(1)-(N) at component 220, and (C) modifying configuration file 126 of virtual router 124 such that the memory of virtual router 124 is scaled to store networking objects 122(1)-(N) via component 220.

Network devices 202(1)-(N) each generally represent any type or form of physical computing device that forwards traffic within a network and/or across networks and/or hosts a virtual router. In one example, one or more of network devices 202(1)-(N) may include and/or represent a router, such as a Customer Edge (CE) router, a Provider Edge (PE) router, a hub router, a spoke router, an Autonomous System (AS) boundary router, and/or an area border router. Additional examples of network devices 202(1)-(N) include, without limitation, switches, hubs, modems, bridges, repeaters, gateways, network racks and/or chassis, servers, computers, laptops, desktops, portions of one or more of the same, combinations or variations of one or more of the same, and/or any other suitable network devices.

Computing device 206 generally represents any type or form of physical computing device capable of reading computer-executable instructions and/or communicating with other devices. In one example computing device 206 may include and/or represent a client device, server, and/or router. Additional examples of computing device 206 include, without limitation, laptops, tablets, desktops, servers, cellular phones Personal Digital Assistants (PDAs), multimedia players, embedded systems, wearable devices (e.g., smart watches, smart glasses, etc.), gaming consoles, network devices, variations or combinations of one or more of the same, and/or any other suitable computing devices. Although illustrated as a single entity in FIG. 2, computing device 206 may include and/or represent a plurality of devices that work and/or operate in conjunction with one another.

Network 204 generally represents any medium or architecture capable of facilitating communication or data transfer. In one example, network 204 may facilitate communication among network devices 202(1)-(N) and computing device 206. In this example, network 204 may facilitate communication or data transfer using wireless and/or wired connections. Examples of network 204 include, without limitation, an intranet, a Wide Area Network (WAN), a Local Area Network (LAN), a Virtual LAN (ULAN), a Personal Area Network (PAN), the Internet, Power Line Communications (PLC), a cellular network (e.g., a Global System for Mobile Communications (GSM) network), a virtual network, portions of one or more of the same, variations or combinations of one or more of the same, and/or any other suitable network. Although network devices 202(1)-(N) and computing device 206 are illustrated as being external to network 204 in FIG. 2, these devices may alternatively represent part of and/or be included in network 204.

Component 220 generally represents any type or form of physical and/or logical computing device and/or unit that enables a network device to route, forward, and/or receive traffic. In one example, component 220 may include and/or represent at least one routing engine of network device 202(1). In another example, component 220 may include and/or represents space and/or kernel space on the routing engine of network device 202(1). In a further example, component 220 may include and/or represent at least one Flexible Physical Interface Card (PIC) Concentrator (FPC) of network device 202(1). Additional examples of component 220 include, without limitation, memory devices, Packet Forwarding Engines (PFEs), PICs, operating system kernels, portions of one or more of the same, variations of one or more of the same, and/or any other suitable component.

Figure 3:
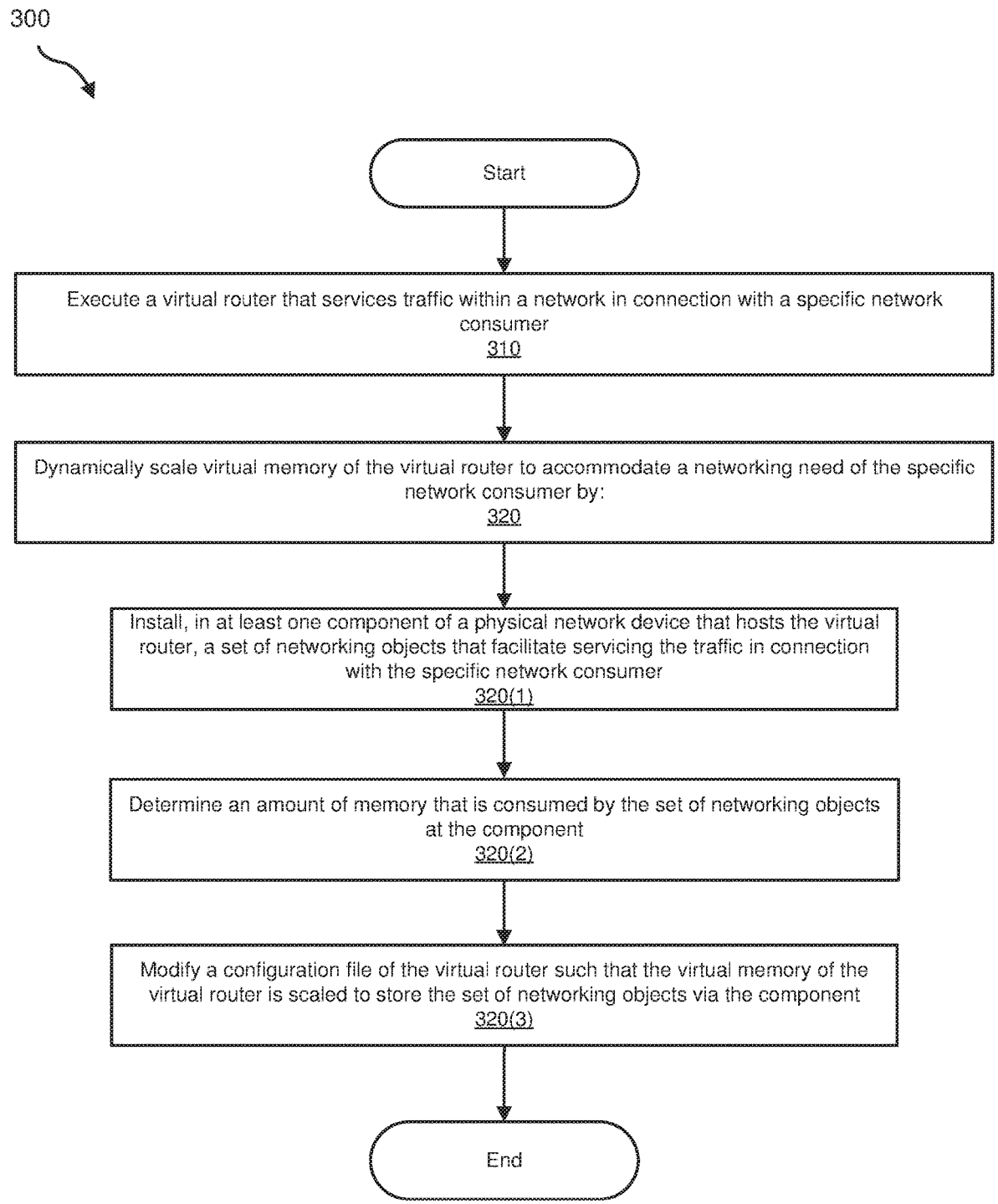
FIG. 3 is a flow diagram of an exemplary method for dynamically scaling memory for virtual routers.

FIG. 3 is a flow diagram of an exemplary computer-implemented method 300 for dynamically scaling memory for virtual routers. The steps shown in FIG. 3 may be performed by any suitable computer-executable code, computing system, and/or ASIC, including system 100 in FIG. 1, system 200 in FIG. 2, any portion of network device 202(1) in FIGS. 4-6, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may execute a virtual router that services traffic within a network in connection with a specific network consumer. For example, virtualization module 104 may, as part of network device 202(1) in FIGS. 2 and 4-6, execute virtual router 124 for and/or on behalf of an ISP, a telecommunications provider, and/or a media service provider. In this example, virtual router 124 may service and/or facilitate the flow of traffic to computing device 206 via network 204 in connection with that ISP, telecommunications provider, and/or media service provider.

The term "traffic," as used herein, generally refers to any type of form of flow and/or transfer of data within a network. In one embodiment, the network traffic may include data encapsulated in packets. Examples of such packets include, without limitation IPv4 packets, IPv6 packets, Gateway-to-Gateway Protocol packets, Internet Group Message Protocol (IGMP) packets Transmission Control Protocol (TCP) packets, variations or combinations of one or more of the same, and/or any other suitable packets.

The systems described herein may perform step 310 in a variety of different ways and/or contexts. In some examples, virtualization module 104 may launch virtual router 124 by executing configuration file 126. For example, virtualization module 104 may identify configuration file 126 on network device 202(1) and then direct network device 202(1) to execute configuration file 126. By directing network device 202(1) to execute configuration file 126 in this way, virtualization module 104 may effectively bring online and/or spin up virtual router 124. Once brought online and/or spun up, virtual router 124 may service and/or facilitate the flow of traffic within network 204 in connection with that ISP, telecommunications provider, and/or media service provider.

Returning to FIG. 3, at step 320 one or more of the systems described herein may dynamically scale memory of the virtual router to accommodate a networking need of the specific network consumer. For example, scaling module 108 may, as part of network device 202(1) in FIGS. 2 and 4-6, dynamically scale memory of virtual router 124 to accommodate a networking need of the ISP, telecommunications provider, and/or media service provider. The term "networking need," as used herein, generally refers to one or more requirements, obligations, and/or goals of a network consumer in connection with servicing traffic within a network and/or across networks.

In some examples, a networking need may involve storing the networking objects of the specific consumer. However, the networking need may also involve saving costs on storing the networking objects and/or optimizing the amount of storage used to store the networking objects of the specific consumer. Accordingly, the networking need may involve and/or take into account various factors, considerations, and/or interests (even competing interests) of the specific consumer.

As a specific example, an ISP may want to customize and/or tailor its virtual router to optimize the amount of memory allocated to its virtual router. The ISP may have several reasons and/or motivations for doing so. For example, the ISP may want to reduce and/or minimize its operating costs in connection with the virtual router. Additionally or alternatively, the ISP may want to conserve the memory on the underlying physical host for the purpose of environmental, energy, and/or computing-resource conservation.

As another example, an ISP may want its virtual router to include an amount of memory that is sufficient to store its existing networking objects and also provide some additional space in anticipation of acquiring additional networking objects in the future. Accordingly, the ISP may want to increase the amount of memory allocated to its virtual router by a certain size to ensure that the virtual router is able to store additional networking objects later. In addition, the ISP may want to prevent any unnecessary increase (beyond that certain size) to the amount of memory allocated to its virtual router when dynamically scaling.

The systems described herein may perform step 320 in a variety of different ways and/or contexts. In some examples, scaling module 108 may determine the amount of memory consumed by networking objects 122(1)-(N). Scaling module 108 may then modify configuration file 126 to allocate approximately that same amount (or a slightly higher amount) of memory on network device 202(1) to virtual router 124.

As illustrated in FIG. 3, step 320 may include and/or involve one or more sub-steps (e.g., sub-steps 320(1)-(N)) that facilitate dynamically scaling the memory of the virtual router to accommodate the networking need of the specific network consumer. For example, at sub-step 320(1) routing daemon 106 may, as part of network device 202(1) in FIGS. 2 and 4-6, install some of networking objects 122(1)-(N) in at least one component 220 of network device 202(1). In one example, component 220 may include and/or represent a routing engine. In another example, component 220 may include and/or represent an FPC.

Figure 4:
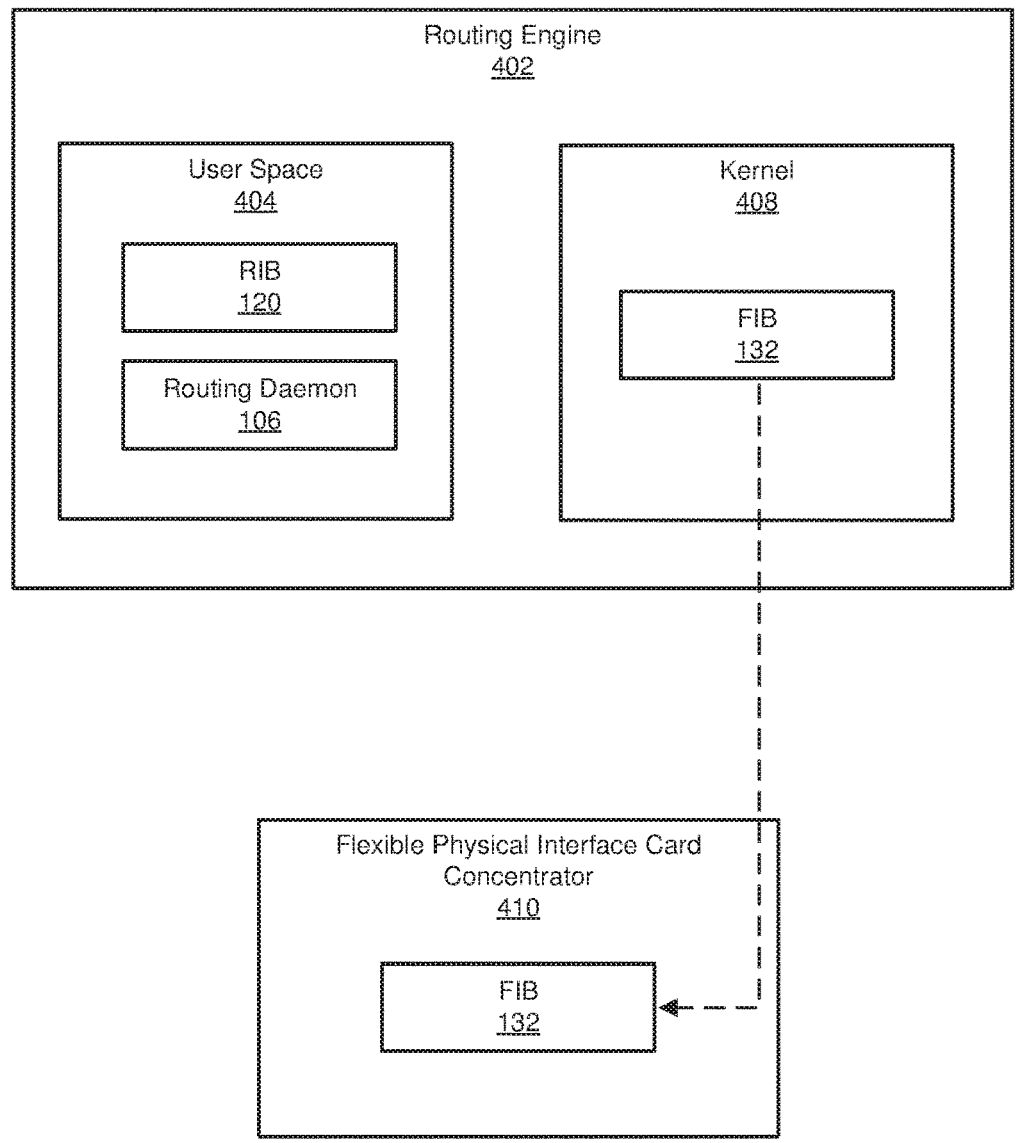
FIG. 4 is a block diagram of an exemplary network device that dynamically scales memory for virtual routers.

As a specific example in connection with FIG. 4, routing daemon 106 may a monitor, detect, and/or collect the various networking objects being advertised by other network devices (e.g. network device 202(N)). For example, upon detecting networking object 122(1) as advertised by network device 202(N), routing daemon 106 may populate RIB 120 in FIG. 4 with networking object 122(1). Similarly upon detecting networking object 122(N) as advertised by another network device (not necessarily illustrated in FIG. 2), routing daemon 106 may populate RIB 120 in FIG. 4 with networking object 122(N). In this example, network device 202(1) may include a routing engine 402 and an FPC 410.

Routing engine 402 generally represents any physical device and/or hardware that handles routing procedures, processes, and/or decisions in a network device. Routing engine 402 may include one or more ASICs and/or physical processors. In one example, routing engine 402 may control certain physical and/or virtual interfaces of network device 202(1). In addition, routing engine 402 may include an operating system and/or certain applications that facilitate communication between network device 202(1) and other devices within network 204.

In one example routing engine 402 may include a variable amount of memory that is allocated and/or dedicate to the VCP and/or VFP of virtual router 124. For example, the amount of user-space memory at routing engine 402 that is allocated and/or dedicated to the VCP may vary and/or be scaled to meet the specific consumer's needs. Additionally or alternatively, the amount of kernel-space memory at routing engine 402 that is allocated and/or dedicated to the VFP may vary and/or be scaled to meet the specific consumer's needs.

In some examples, routing daemon 106 may install and/or push RIB 120 to user space 404 on routing engine 402. In one example, routing daemon 106 may apply one or more routing algorithms to RIB 120. Such algorithms may enable routing daemon 106 to select a subset of networking objects 122(1)-(N). In this example, the selected subset may include one or more of networking objects 122(1)-(N) but less than all of networking objects 122(1)-(N). In other words, at least one of networking objects 122(1)-(N) may be omitted and/or excluded from the selected subset. Routing daemon 106 may then populate FIB 132 in FIG. 4 with the selected subset of networking objects.

In some examples, routing daemon 106 may install and/or push FIB 132 to kernel 408 on routing engine 402. Additionally or alternatively, routing daemon 106 may install and/or push FIB 132 to FPC 410 in FIG. 4 on network device 202(1). FPC 410 generally represents any physical device and/or hardware that houses, stores, and/or concentrates multiple PICs and/or line cards. For example, FPC 410 may house and/or include multiple PICs (not illustrated in FIG. 4) that receive traffic incoming to network device 202(1) and/or forward traffic outgoing from network device 202(1). In one example, FPC 410 may include a variable amount of memory that is allocated and/or dedicate to the VFP of virtual router 124. In other words, the amount of memory at FPC 410 that is allocated and/or dedicated to the VFP may vary and/or be scaled to meet the specific consumer's needs.

As illustrated in FIG. 4, RIB 120 and routing daemon 106 may reside and/or operate in user space 404 on routing engine 402. In contrast, FIB 132 may reside and/or operate in kernel 408 on routing engine 402 and/or in FPC 410.

Returning to FIG. 3, at sub-step 320(2), scaling module 108 may, as part of network device 202(1) in FIGS. 2 and 4-6, determine the amount of memory that is consumed by the corresponding networking objects at component 220. For example, scaling module 108 may query kernel 408 and/or FPC 410 for the amount of memory consumed and/or required by FIB 132. Upon receipt of this query, kernel 408 and/or FPC 410 may identify, measure, and/or determine the amount memory consumed and/or required by FIB 132 since installation. Kernel 408 and/or FPC 410 may generate memory information that identifies and/or is used to determine this amount of memory and then send the memory information to routing engine 402.

In one example, the memory information generated by kernel 408 and/or FPC 410 may identify the total amount of memory consumed by FIB 132 at kernel 408 and/or FPC 410, respectively. In another example, the memory information generated by kernel 408 and/or FPC 410 may identify multiple object types that correspond to the networking objects within FIB 132. In this example, for each different object type, the memory information may identify the amount of memory consumed and/or required by all the networking objects of that object type.

As a specific example, the memory information may identity the selected subset of networking objects populated in FIB 132 as including "ifd" objects, "ifl " objects, next hops objects, and routes. In this example, the memory information may also identify the subtotal amounts of memory consumed and/or necessitated by each of the "ifd" object group, the "ifl" object group, the next hop object group and the routes group.

As the memory information arrives at routing engine 402, scaling module 108 may analyze the memory information to determine the amount of memory consumed and/or required by FIB 132 and/or the corresponding subset of networking objects at FPC 410. For example, scaling module 108 may identify the total amount of VFP memory required by FIB 132 at kernel 408 and/or FPC 410 by analyzing the memory information. Additionally or alternatively, scaling module 108 may calculate the total amount of VFP memory required by FIB 132 at kernel 408 and/or FPC 410 by summing up all the subtotal amounts of memory identified in the memory information.

In one example, scaling module 108 may calculate the amount of memory required by RIB 120 within user space 404 on routing engine 402 based at least in part on the differential between the free VCP memory and the total VCP memory capacity. For example, scaling module 108 may identify the total memory capacity within user space 404 on routing engine 402. Scaling module 108 may also identify the amount of memory that is still free within user space 404 after installation of RIB 120. Scaling module 108 may then calculate the amount of memory required by RIB 120 within user space 404 on routing engine 402.

Returning to FIG. 8, at sub-step 320(3), scaling module 108 may, as part of network device 202(1) in FIGS. 2 and 4-6, modify configuration file 126 of virtual router 124 such that the memory allocated to virtual router 124 is optimally scaled to store the corresponding networking objects via component 220. For example, scaling module 108 may increase the amount of memory allocated to virtual router 124 based at least in part on the amount of memory consumed by networking objects 122(1)-(N) and/or the selected subset of networking objects at component 220. Alternatively, scaling module 108 may decrease the amount of memory allocated to virtual router 124 based at least in part on the amount of memory consumed by networking objects 122(1)-(N) and/or the selected subset of networking objects at component 220.

In some examples, scaling module 108 may calculate the amount of memory to allocate to virtual router 124. For example, scaling module 108 may identify the amount of memory consumed and/or required by the corresponding networking objects at component 220. In this example, scaling module 108 may allocate, to virtual router 124, an amount of memory that is between 10 and 15 percent greater than the amount of memory consumed and/or required by the set of networking objects at the component.

In some examples, scaling module 108 may modify configuration file 126 such that the memory of virtual router 124 is scaled to store networking objects 122(1)-(N) in RIB 120 within user space 404 on routing engine 402. Additionally or alternatively, scaling module 108 may modify configuration file 126 such that the memory of virtual router 124 is scaled to store the selected subset of networking objects in FIB 132 within kernel 408 on routing engine 402 and/or at FPC 410.

In some examples, scaling module 108 may search configuration file 126 for one or more entries that controls the size of memory allocated and/or dedicated to the VCP and/or VFP of virtual router 124 on network device 202(1). In one example, scaling module 108 may identify, within configuration file 126, an entry that controls the size of user-space memory that is allocated to the VCP of virtual router 124 on routing engine 402. In another example, scaling module 108 may identify, within configuration file 126, an entry that controls the size of kernel-space memory allocated to the VFP of virtual router 124 on routing engine 402. Additionally or alternatively, scaling module 108 may identify, within configuration file 126, an entry that controls the size of memory allocated to the VFP of virtual router 124 on FPC 410. Upon identifying such entries during the search, scaling module 108 may change and/or replace any of the entries to correspond to and/or represent the new scaled amount of memory to be allocated and/or dedicated to virtual router 124.

In some examples, the new scaled amount of memory for virtual router 124 may correspond to and/or reflect the amount of memory required by RIB 120, FIB 132, and/or the corresponding networking objects on routing engine 402 and/or FPC 410. In other examples, the new scaled amount of memory for virtual router 124 may correspond to and/or reflect a memory size that is slightly larger than the amount required by RIB 120, FIB 132, and/or the corresponding networking objects.

In one example, the new scaled memory allocation may include and/or represent some VCP memory within user space 404 on routing engine 402. Additionally or alternatively, the new scaled memory allocation may include and/or represent some VFP memory within kernel 408 on routing engine 402 and/or in FPC 410.

In some examples, once configuration file 126 has been modified, virtualization module 104 may reboot and/or restart virtual router 124 to complete the new scaled memory allocation of component 220 to virtual router 124. In one example, the new scaled memory allocation may be larger than a minimum size limit (e.g., the minimum amount of memory required to store RIB 120 in user space 404, the minimum amount of memory required to store FIB 132 in kernel 408, and/or the minimum amount of memory required to store FIB 132 in FPC 410). Additionally or alternatively, the new scaled memory allocation may be smaller than a maximum size limit (e.g., 115% of the minimum amount of memory required to store RIB 120 in userspace 404, 115% of the minimum amount of memory required to store FIB 132 in kernel 408, and/or 115% of the minimum amount of memory required to store FIB 132 in FPC 410).

Figure 6:
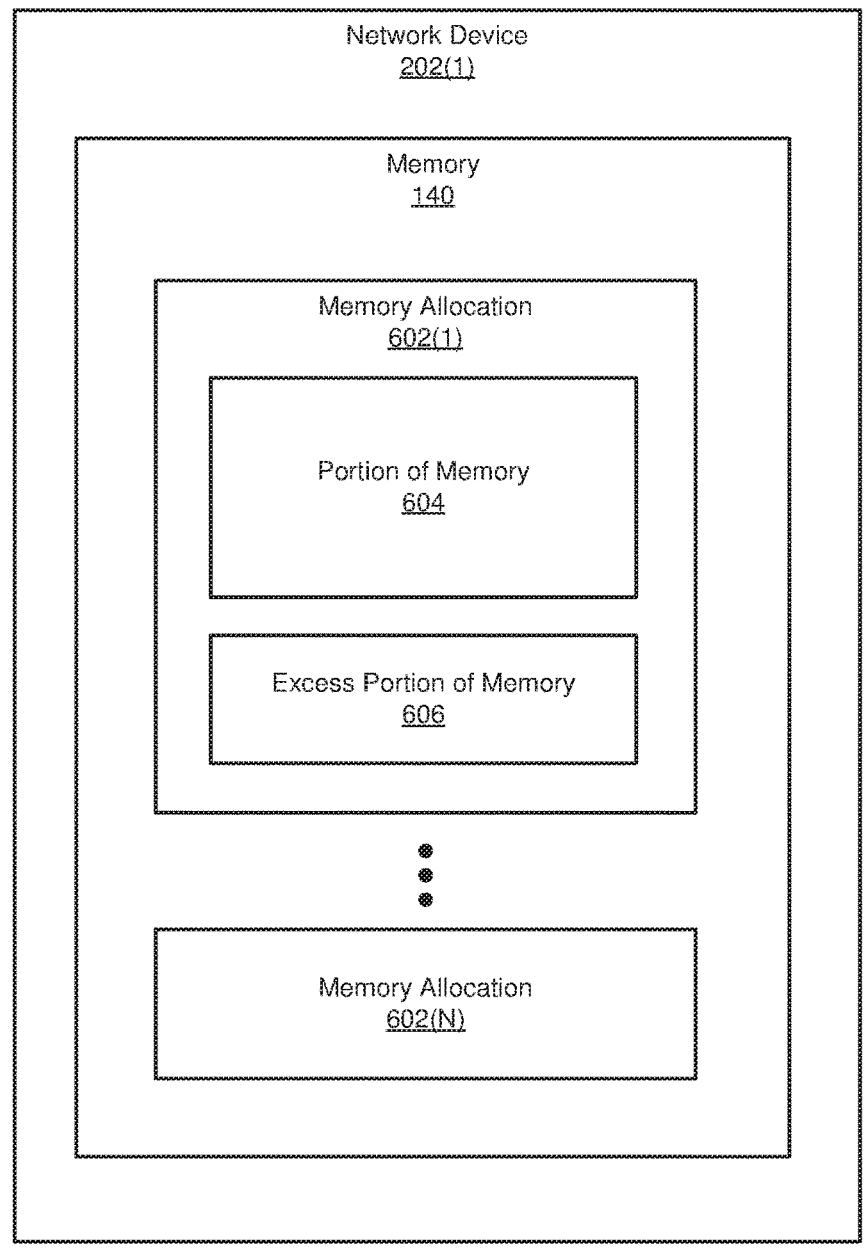
FIG. 6 is a block diagram of an exemplary implementation of dynamically scaling memory for virtual routers.

As a specific example in connection with FIG. 6, by rebooting and/or restarting virtual router 124, virtualization module 104 may complete a memory allocation 602(1) to virtual router 124 in accordance with configuration file 126. In this example, memory allocation 602(1) may include a portion of memory 604 that is consistent with the amount of memory required to store RIB 120 and/or FIB 132 in component 220. Memory allocation 602(1) may also include an excess portion of memory 606 that is between 10 and 15 percent of the size of portion of memory 604. Excess portion of memory 606 may be included as a buffer in anticipation of additional networking objects being added in the future.

As illustrated in FIG. 6, networking device 202(1) may include and/or provision memory allocations 602(1)-(N). In one example, memory allocation 602(1) may include and/or represent memory that is allocated and/or dedicated to virtual router 124. In this example, memory allocation 602(N) may include and/or represent the memory that is allocated and/or dedicated to another virtual router, which may belong and/or to the same network consumer or a different consumer.

In some examples virtualization module 104 may release, to component 220, any excess portion of memory that is no longer needed by virtual router 124 to store networking objects 122(1)-(N) and/or anticipated future objects in RIB 120 at component 220. Additionally or alternatively, virtualization module 104 may release, to component 220, any excess portion of memory that is no longer needed by virtual router 124 to store the selected subset of networking objects and/or anticipated future objects in FIB 132 at component 220.

In some examples, scaling module 108 may expedite and/or speed up the process of determining the new scaled memory size by partitioning the selected subset of networking objects into two or more FIBS and then installing those FIBs into two or more FPCs. As specific example in connection with FIG. 5, routing daemon 106 may populate FIB 132 with a subset of networking objects 122(1)-(N) and then install FIB 132 into FPC 410(1) in FIG. 5. Routing daemon 106 may also populate FIB 532 with a different subset of networking objects 122(1)-(N) and then install FIB 532 into FPC 410(2) in FIG. 5.

Figure 5:
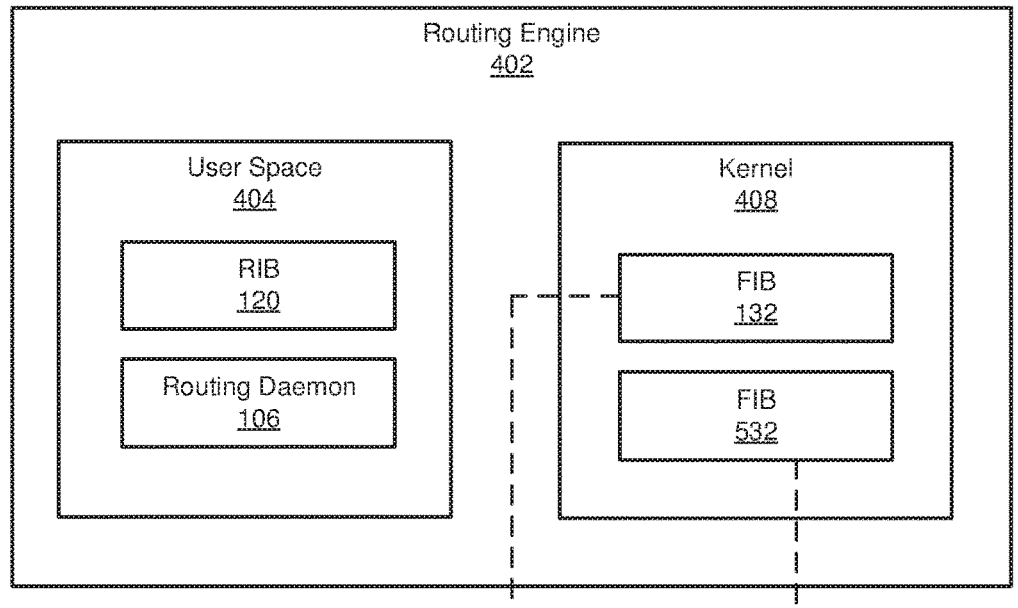
FIG. 5 is a block diagram of an exemplary network device that dynamically scales memory for virtual routers.
Figure 5:
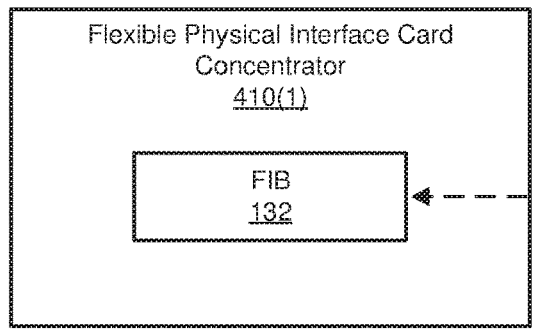
Figure 5:
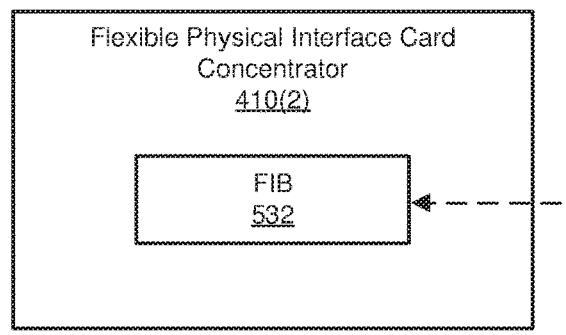

Continuing with this example, scaling module 108 may determine the amount of memory that is consumed and/or required by FIB 132 at FPC 410(1) in FIG. 5. Similarly, scaling module 108 may also determine the amount of memory that is consumed and/or required by FIB 532 at FPC 410(2) in FIG. 5. Scaling module 108 may then modify configuration file 126 such that the memory allocated to virtual router 124 is optimally scaled to store these subsets of networking objects via FPC 410(1) and/or FPC 410(2).

Figure 7:
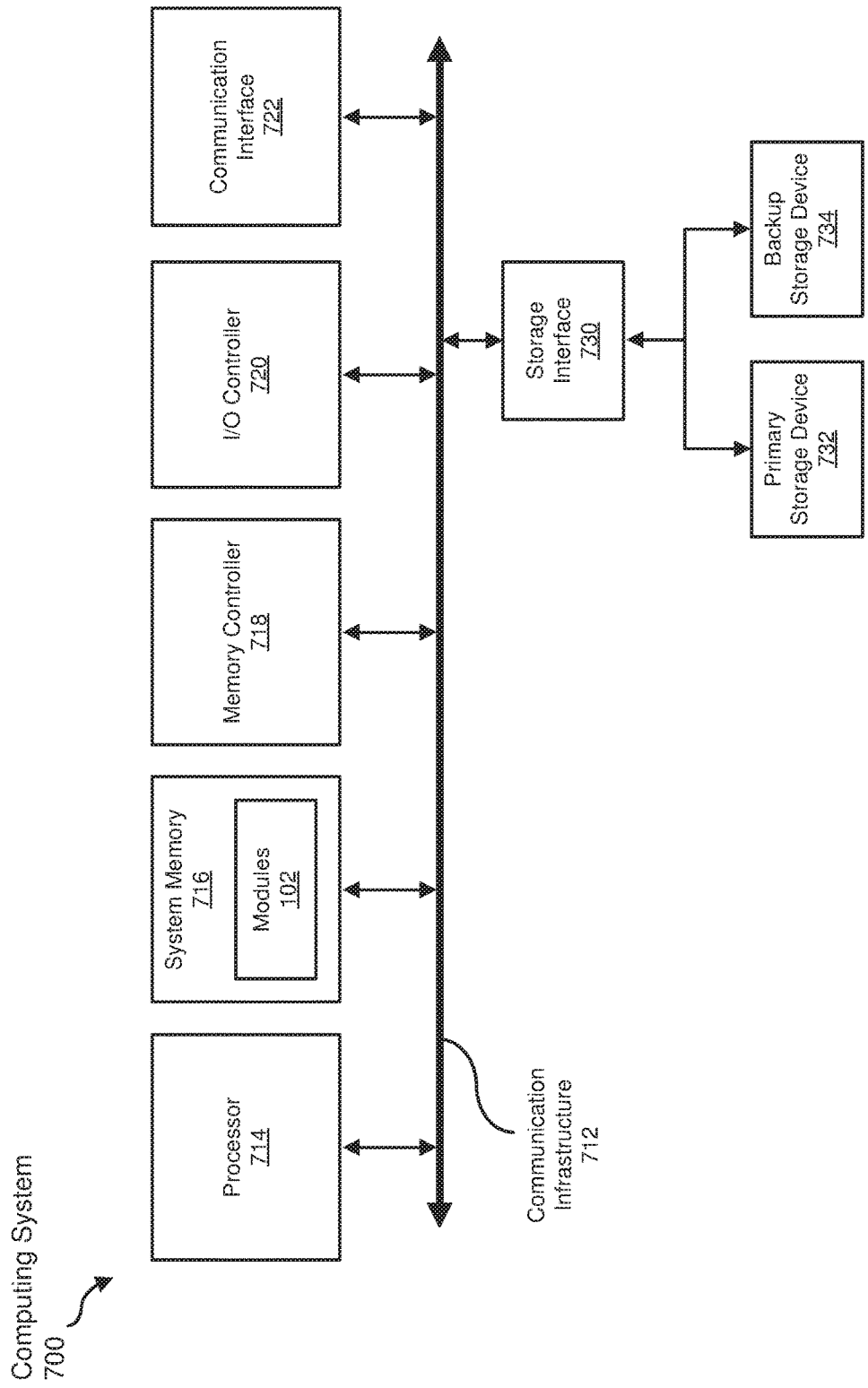
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include, represent and/or implement exemplary system 100 from FIG. 1.

Computing system 700 broadly represents any type or form of electrical load, including a single or multi-processor computing device or system capable of executing computer-readable instructions. Examples of computing system 700 include, without limitation, workstations, laptops, clientside terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general-purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing.

For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive a flash drive or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   executing a virtual router that services traffic in connection with a specific network consumer; and
   dynamically scaling memory of the virtual router to accommodate a networking need of the specific network consumer by:
      installing, in at least one component of a physical network device that hosts the virtual router, a set of networking objects that facilitate servicing the traffic in connection with the specific network consumer;
      determining an amount of memory that is consumed by the set of networking objects at the component of the physical network device; and
      modifying a configuration file of the virtual router such that the memory of the virtual router is scaled to store the set of networking objects via the component.

2. The method of claim 1, further comprising, upon modifying the configuration file of the virtual router, rebooting the virtual router to complete a memory allocation of the component to the virtual router.

3. The method of claim 2, wherein the memory allocation of the component is both:

larger than a minimum size limit; and smaller than a maximum size limit.

4. The method of claim 3, wherein the minimum size limit of the memory allocation is sufficient to store the set of networking objects.

5. The method of claim 1, wherein dynamically scaling the memory of the virtual router comprises:

increasing an amount of memory allocated to the virtual router based at least in part on the amount of memory consumed by the set of networking objects at the component; and decreasing an amount of memory allocated to the virtual router based at least in part on the amount of memory consumed by the set of networking objects at the component.

6. The method of claim 5, wherein dynamically scaling the memory of the virtual router comprises calculating the amount of memory to allocate to the virtual router by:

identifying the amount of memory consumed by the set of networking objects at the component; and allocating, to the virtual router, an amount of memory that is between 10 and 15 percent greater than the amount of memory consumed by the set of networking objects at the component.

7. The method of claim 1, further comprising:

detecting, at a routing engine of the physical network device, the set of networking objects being advertised by one or more additional routers within the network; and populating, within user space on the routing engine, a routing information base with the set of networking objects advertised by the additional routers.

8. The method of claim 7, further comprising:

selecting, based at least in part on a routing algorithm, a subset of the networking objects populated in the routing information base; and populating, within a kernel of the routing engine, a forwarding information base with the selected subset of networking objects from the routing information base.

9. The method of claim 8, wherein:

the component of the physical network device comprises the kernel of the routing engine; and installing the set of networking objects in the component of the physical network device comprises installing the forwarding information base within the kernel on the routing engine.

10. The method of claim 8, wherein:

the component of the physical network device comprises at least one flexible physical interface card concentrator of the physical network device; and installing the set of networking objects in the component of the physical network device comprises installing the forwarding information base in the flexible physical interface card concentrator.

11. The method of claim 8, wherein dynamically scaling the memory of the virtual router comprises:

modifying the configuration file of the virtual router such that the memory of the virtual router is scaled to store the selected subset of networking objects in the forwarding information base at the component; and releasing, to the component, an excess portion of memory that is not needed by the virtual router to store the selected subset of networking objects in the forwarding information base at the component.

12. The method of claim 8, wherein dynamically scaling the memory of the virtual router comprises:

modifying the configuration file of the virtual router such that the memory of the virtual router is scaled to store the set of networking objects in the routing information base at the component; and releasing, to the component, an excess portion of memory that is not needed by the virtual router to store the set of networking objects in the routing information base at the component.

13. The method of claim 8, wherein determining the amount of memory consumed by the set of networking objects comprises:

querying, by the routing engine, the component for the amount of memory consumed by the set of networking objects; and receiving, from the component in response to the query, memory information that identifies the amount of memory that is consumed by the forwarding information base at the component.

14. The method of claim 13, wherein the memory information identifies:

a plurality of object types that correspond to the selected subset of networking objects populated in the forwarding information base; and for each object type included in the plurality, an amount of memory consumed by the networking objects of the object type.

15. The method of claim 7, wherein:

the component of the physical network device comprises the routing engine; and installing the set of networking objects in the component of the physical network device comprises installing the routing information base within user space on the routing engine.

16. The method of claim 1, wherein:

installing the set of networking objects in the component comprises:

installing a first subset of the networking objects in a first component of the physical network device; and installing a second subset of the networking objects in a second component of the physical network device;

determining the amount of memory that is consumed by the set of networking objects comprises:

determining a first amount of memory that is consumed by the first subset of networking objects at the first component; and determining a second amount of memory that is consumed by the second subset of networking objects at the second component; and modifying the configuration file of the virtual router comprises modifying the configuration file of the virtual router such that the memory of the virtual router is scaled to store the first and second subsets of networking objects via the first and second components.

17. The method of claim 1, further comprising releasing, to the component, an excess portion of memory that is not needed by the virtual router to store the set of networking objects.

18. The method of claim 1, wherein the networking need of the specific network consumer comprises:

allocating, to the virtual router, an amount of memory that is sufficient to store the set of networking objects;

increasing the amount of memory allocated to the virtual router by a certain size that is dedicated to storing one or more other networking objects added at a subsequent point in time; and preventing any further increase to the amount of memory allocated to the virtual router when the memory of the virtual router is dynamically scaled.

19. A system comprising:
a virtualization module, stored in memory, that executes a virtual router that services traffic within in connection with a specific network consumer;
a routing daemon, stored in memory, that installs, in at least one component of a physical network device that hosts the virtual router, a set of networking objects that facilitate servicing the traffic in connection with the specific network consumer;
a scaling module, stored in memory, that dynamically scales memory of the virtual router to accommodate a networking need of the specific network consumer by:
determining an amount of memory that is consumed by the set of networking objects at the component; and
modifying a configuration file of the virtual router such that the memory of the virtual router is scaled to store the set of networking objects via the component; and
at least one physical processor configured to execute the virtualization module, the routing daemon, and the scaling module.

20. An apparatus comprising:
at least physical storage device that stores a set of networking objects that facilitate servicing traffic in connection with a specific network consumer; and
at least one physical processor communicatively coupled to the physical storage device, wherein the physical processor:
executes a virtual router that services traffic in connection with a specific network consumer; and
dynamically scales memory of the virtual router to accommodate a networking need of the specific network consumer by:
installing the set of networking objects in at least one component of a physical network device that hosts the virtual router;
determining an amount of memory that is consumed by the set of networking objects at the component; and
modifying a configuration file of the virtual router such that the memory of the virtual router is scaled to store the set of networking objects via the component.

* * * * *